(12) United States Patent
Keremane et al.

(10) Patent No.: US 9,307,011 B2
(45) Date of Patent: Apr. 5, 2016

(54) SYNCHRONOUS MIRRORING OF NVLOG TO MULTIPLE DESTINATIONS (ARCHITECTURE LEVEL)

(71) Applicant: NetApp, Inc., Sunnyvale, CA (US)

(72) Inventors: Hrishikesh Keremane, Bangalore (IN); Vaiapuri Ramasubramaniam, Bangalore (IN); Harihara Kadayam, Fremont, CA (US); Rishab Mittal, New Delhi (IN)

(73) Assignee: NetApp, Inc., Sunnyvale, CA (US)

( * ) Notice: Subject to any disclaimer, the term of this patent is extended or adjusted under 35 U.S.C. 154(b) by 62 days.

(21) Appl. No.: 13/854,815

(22) Filed: Apr. 1, 2013

(65) Prior Publication Data

US 2014/0298078 A1    Oct. 2, 2014

(51) Int. Cl.
*G06F 11/00* (2006.01)
*H04L 29/08* (2006.01)
*G06F 11/07* (2006.01)

(52) U.S. Cl.
CPC ............ *H04L 67/06* (2013.01); *G06F 11/0793* (2013.01); *H04L 67/1095* (2013.01); *H04L 67/1097* (2013.01)

(58) Field of Classification Search
CPC ............ G06F 11/2056; G06F 11/2058; G06F 11/2082; G06F 11/2069; G06F 11/7057; H04L 67/06; H04L 67/1095; H04L 67/1097
USPC .......... 714/1, 6.2, 6.23, 11, 55; 711/114, 161, 711/162
See application file for complete search history.

(56) References Cited

U.S. PATENT DOCUMENTS

| | | | | |
|---|---|---|---|---|
| 6,253,209 B1 * | 6/2001 | Chase-Salerno et al. | ...... | 709/201 |
| 6,282,610 B1 * | 8/2001 | Bergsten | ...... | 711/114 |
| 6,477,591 B1 * | 11/2002 | VanderSpek | ...... | 710/38 |
| 7,085,903 B2 * | 8/2006 | Johnson et al. | ...... | 711/162 |
| 7,143,250 B1 * | 11/2006 | Riedl | ...... | 711/162 |
| 7,657,782 B2 * | 2/2010 | Das et al. | ...... | 714/6.12 |
| 7,743,171 B1 * | 6/2010 | Hwang et al. | ...... | 710/5 |
| 8,041,879 B2 * | 10/2011 | Erez | ...... | 711/103 |
| 8,533,539 B2 * | 9/2013 | Marathe et al. | ...... | 714/48 |
| 2005/0246504 A1 * | 11/2005 | Frey et al. | ...... | 711/150 |
| 2005/0262309 A1 * | 11/2005 | Frey et al. | ...... | 711/141 |
| 2006/0005074 A1 * | 1/2006 | Yanai et al. | ...... | 714/5 |
| 2008/0168246 A1 * | 7/2008 | Haustein et al. | ...... | 711/162 |
| 2008/0222356 A1 * | 9/2008 | Mimatsu et al. | ...... | 711/114 |
| 2009/0037677 A1 * | 2/2009 | Coronado et al. | ...... | 711/162 |
| 2011/0320889 A1 * | 12/2011 | Balasubramanyan et al. | ...... | 714/55 |
| 2015/0113095 A1 * | 4/2015 | McCabe et al. | ...... | 709/217 |
| 2015/0121131 A1 * | 4/2015 | Kiselev et al. | ...... | 714/6.23 |

* cited by examiner

*Primary Examiner* — Marc Duncan
(74) *Attorney, Agent, or Firm* — Cooper Legal Group, LLC

(57) ABSTRACT

Systems and methods herein are operable to simultaneously mirror data to a plurality of mirror partner nodes. In embodiments, a mirror client may be unaware of the number of mirror partner nodes and/or the location of the plurality of mirror partner nodes, and issue a single mirror command requesting initiation of a mirror operation. An interconnect layer may receive the single mirror command and split the mirror command into a plurality of mirror instances, one for each mirror node partner, wherein the mirror instances may be simultaneously launched. After the plurality of mirror operations has begun, the interconnect layer may manage completion reports indicating the completion status of respective mirror operations, and send a single return to the mirror client indicating whether the mirror command succeeded.

21 Claims, 6 Drawing Sheets

DETAILED DESCRIPTION OF THE INVENTION

Figure 1:
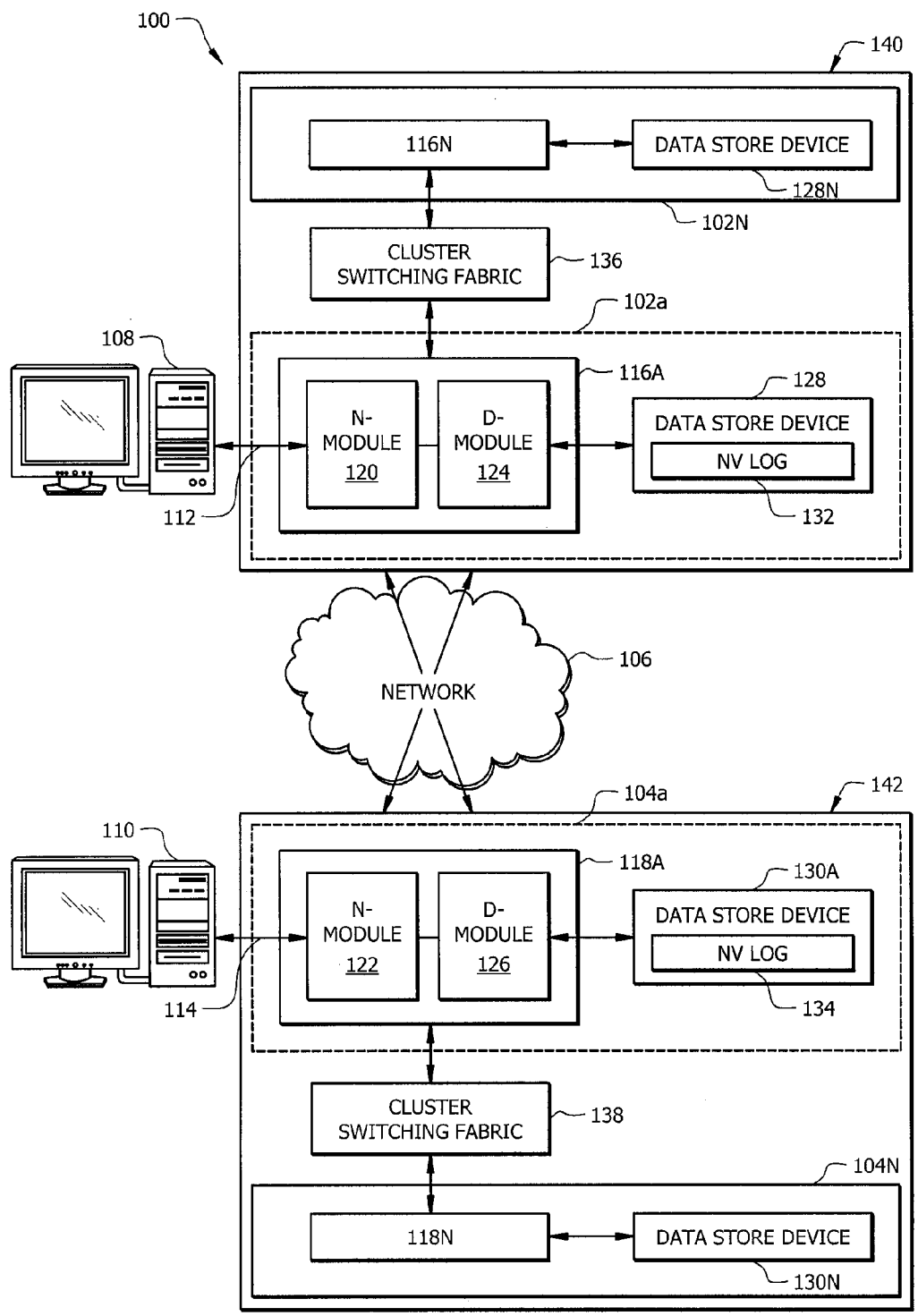

Systems and methods herein are operable to simultaneously mirror data to a plurality of mirror partner nodes. In embodiments, a mirror client may be unaware of the number of mirror partner nodes and/or the location of the plurality of mirror partner nodes. In operation, a mirror client may issue a single mirror command requesting initiation of a mirror operation. An interconnect layer may receive the mirror command and using information therein, determine a number of active mirror partner nodes to mirror the data and determine the location of the active mirror partner nodes. With this information at hand, the single mirror command may be split it into a plurality of mirror instances, one for each identified active mirror partner node. The respective mirror instances may comprise the data to be mirrored, the physical identifier of the respective mirror partner node, and properties of the respective mirror partner node. After the mirror instances are created, the interconnect layer simultaneously sends the mirror instances to a mirror layer, which creates a write command for each respective mirror instance. Thereafter, the mirror layer simultaneously executes each of the write commands.

Upon initiating the write commands, mirror layer may send an update to interconnect layer indicating whether each respective write command successfully launched. Using the information in the update, interconnection layer may determine whether any of the mirroring instances successfully launched. If at least one mirroring instance successfully launched, then the interconnect layer sends a single update to the mirroring client indicating that the mirror command was successfully launched. If any of the mirroring instances were not successfully launched, then the interconnect layer determines which of the mirror partner nodes failed to launch it respective mirror instance and changes the status of that mirror partner node to inactive.

After issuing a mirror command, the mirror client may wait until all writing operations (e.g. successful finishing of local NVLog writing operations and successful finishing of one or more mirroring operations) before acknowledging that the information was logged in the local NVLog. As such, mirror client may send a query requesting confirmation that the mirror command was successful. Interconnect layer may receive the query and determine which mirror operations are of interest based on information in the query. With knowledge of which mirror operations are of interest, interconnect layer may simultaneously issue a plurality of calls, one for each mirror instance, requesting an update of the completion status of the mirror instance. Mirror layer may receive the issued calls and poll the mirror partner nodes for a completion update.

Upon determining the completion status of mirror partner nodes, mirror layer may raise a completion update for a respective mirror partner node to the interconnect layer. Based at least on the received completion update, interconnect layer determines whether any mirror operation has successfully finished without error prior to a timer expiring. If at least one mirror operation successfully finished without error prior to a timer expiring, interconnect layer reports a success to the mirroring client indicating that the mirroring command was a success. In embodiments, as long as at least one mirror operation has successfully finished without error prior to a timer expiring, interconnect layer may report a success even if one or more mirroring operations resulted in an error and even if one or more mirroring operations did not complete prior to the timer's expiration.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

FIG. 1 shows a block diagram of a system adapted to provide High Availability (HA) capabilities and Disaster Recovery (DR) capabilities. System 100 of FIG. 1 comprises an exemplary clustered network environment in which clustered storage server systems 140 and 142 are coupled via network 106. Clustered storage server systems 140 and 142 may comprise data storage systems 102a, 102n, 104a, and 104n of illustrated embodiments, which may comprise one or more modules, components, etc. operable to provide operation as described herein. For example, data storage systems 102a, 102n, 104a, and 104n of the illustrated embodiment comprise nodes 116a, 116n, 118a, and 118n and data store devices 128a, 128n, 130a, and 130n, respectively. It should be appreciated that nodes and/or data store devices of data storage systems 102a, 102n, 104a, and 104n may themselves comprise one or more modules, components, etc. Nodes 116a and 118a of the illustrated embodiment comprise network modules (referred to herein as "N-Modules") 120 and 122 and data modules (referred to herein as "D-Modules") 124 and 126, respectively. Nodes 116n and 118n likewise comprise the aforementioned network modules (not shown). Nodes 116a and 116n may be in communication connection through cluster switching fabric 136. Likewise, Node 118a may be in communication with node 118n through cluster switching fabric 138.

The modules, components, etc. of data storage systems 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein. Throughout the description, if item numbers are related (for example 116a and 116n are related in that the item numbers share the same number (116) but have separate letter designations (a and n), then the related items may be collectively referred to herein by just their number (for example, 116a and 116n may collectively be referred to herein as 116).

Data store devices 128 and 130 may, for example, comprise disk memory, flash memory, optical memory, and/or other suitable computer readable media. Data store devices 128 and 130 may comprise battery backed non-volatile RAM (NVRAM) to provision NVLogs 132 and 134, which operate as write caches. Data modules 124 and 126 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear as locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data store device 130 via communication via network 106 and data module 126 of node 118. The foregoing operation provides a distributed storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

As can be appreciated from the foregoing, system 100 provides a data storage system in which various digital data (or other data) may be created, maintained, modified, and accessed (referred to collectively as data management). A logical mapping scheme providing logical data block mapping information, stored within and stored without the data structures, may be utilized by system 100 in providing such data management. For example, a filesystem implemented by data store devices 128 and 130 may implement a logical data block allocation technique.

In the exemplary configuration of system 100, clients 108 and 110 utilize data storage systems 102 and 104 to store and retrieve data from data store devices 128 and 130. In such an embodiment, for example, client 108 can send data packets to N-module 120 in node 116 within data storage system 102. Node 116 can forward the data packets to data store device 128 using D-module 124. In this example, the client 108 may access data store device 128, to store and/or retrieve data, using data storage system 102 connected by network connection 112. Further, in this embodiment, client 110 can exchange data with N-module 122 in node 118 within data storage system 104 (e.g., which may be remote from data storage system 102). Node 118 can forward the data to data storage device 130 using D-module 126, thereby accessing the data storage device 130.

Figure 2A:
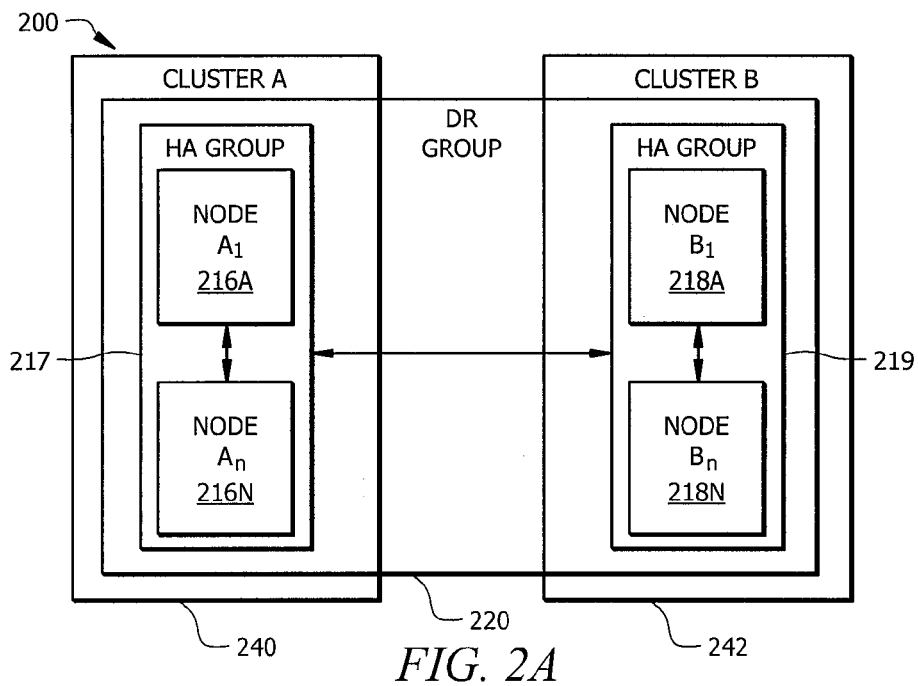

FIG. 2 shows an example of a clustered storage system 200. Example clustered storage system 200 is a clustered solution that provides both High Availability (HA) capabilities and Disaster Recovery (DR) capabilities. HA provides protection in the event of a hardware and/or software failure resulting in the failure of one or more nodes within a site. In an HA scenario, a portion of nodes within a site fail, while other nodes within the site remain operational. Upon a node failure, HA is operational to cause an operational node within the site to automatically takeover (e.g. an auto-takeover) operations that were previously serviced by the failing node and its data storage devices. In HA, the node taking over operations is located a small distance away from the failing node (e.g. meters away).

DR provides protection in the event of a failure of one or more sites. In a DR scenario, a threshold number of nodes (e.g. all nodes) within a site fail thereby causing the entire site to be considered in failure. Upon a site failure, DR is operational to cause an operational node located in a different site to take over operations that were previously serviced by the failing node and its data storage devices. In DR, the node taking over the operations is located a larger distance away from the failing node (e.g. kilometers away).

In order for an operational node to take over operations of a failing node, embodiments herein take precautionary steps to mirror the NVLog of a node onto a plurality of partner nodes. Example clustered storage system 200 shows a scalable example cluster system wherein the NVLog of one or more nodes is mirrored onto a plurality of partner nodes. Example clustered storage system 200 comprises a number of nodes including nodes 216a, 216n, 218a, and 218n. In embodiments, nodes 216a, 216n, 218a, and 218n may respectively correspond to figure 1's nodes 116a, 116n, 118a, and 118n, and their data storage devices. Example clustered storage system 200 is dynamically scalable, and as such, any number of nodes may be added to or taken away from Example clustered storage system 200 at any given time. Nodes 216a and 216n are part of cluster A and located within the same site, site 240. Node 216a is located within meters of node 216n. Being that node 216a and 216n are in relatively close proximity to each other, nodes 216a and 216n are grouped into HA group 217. Node 216a is operational to mirror the NVLog of node 216n, and node 216n is operational to mirror the NVLog of node 216a. Due to the mirroring, if node 126a fails, node 216n has a mirror of node 216a's NVLog. Thus, an HA operation may cause node 216n to take over the operations of failing node 216a, and the takeover may be seamless (e.g. without data loss or data corruption).

Nodes 218a and 218n are part of cluster B and located within the same site, site 242. Node 218a is located within meters of node 218n. Being that nodes 218a and 218n are in relatively close proximity to each other, nodes 218a and 218n are grouped into a HA group 219. Node 218a is operational to mirror the NVLog of node 218n, and node 218n is operational to mirror the NVLog of node 218a. Due to the mirroring, if node 218a fails, node 218n has a mirror of node 218a's NVLog. Thus, an HA operation may cause node 218n to take over the operations of failing node 218a, and the takeover may be seamless.

Site 240 is remotely located from site 242. As such, HA group 217 is remotely located from HA group 219, and thus, the HA groups are relatively far away from each other (e.g. kilometers away). HA group 217 and HA group 219 are grouped into DR group 220. HA group 217 is operational to mirror the NVLog of HA group 219, and HA group 219 is operational to mirror the NVLog of HA group 217. Due to the mirroring, if HA group 217 fails, HA group 219 has a mirror of HA group 217's data. Thus, a DR operation may cause HA group 219 to take over the operations of failing HA group 217, and the takeover may be without data loss or data corruption.

In example clustered storage system 200, when the mirroring client issues a mirror command, the mirror command is split into a plurality of mirror instances for the nodes within node 216a's HA group 217 and the nodes within node 216a's DR Group 220. As such, in this example, at least three mirroring instances will issue, one to each of 216n, 218a, and 218n. Further, when it comes time to determine whether a mirroring command was successful, a query issues which is used in determining whether the NVLog was successfully mirrored on any of 216n, 218a, and 218n.

Embodiments disclosed herein synchronously mirror data and metadata of an NVLog to two or more partners by encapsulating the management of multiple partners and their properties in an interconnect layer. The mirroring clients (WAFL/RAID/EMS subsystems etc.) are unaware of the existence of multiple partners and issue a single operation for mirroring and a single query to determine the mirroring's status. In embodiments, interconnect layer manages the multiple partners, and as such, mirroring clients may remain naïve, if desired, about the partners involved in the mirroring process.

Figure 2B:
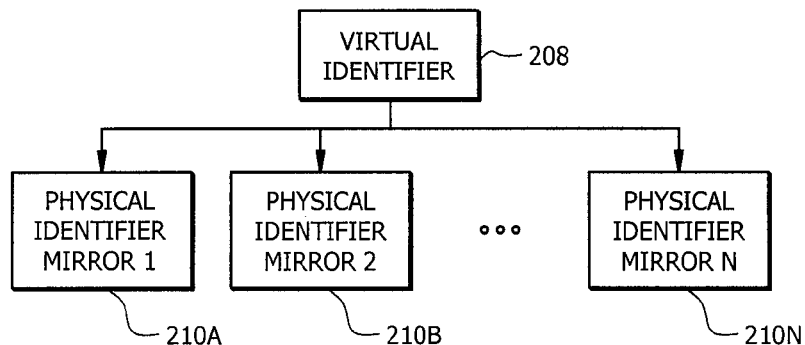
Figure 3:
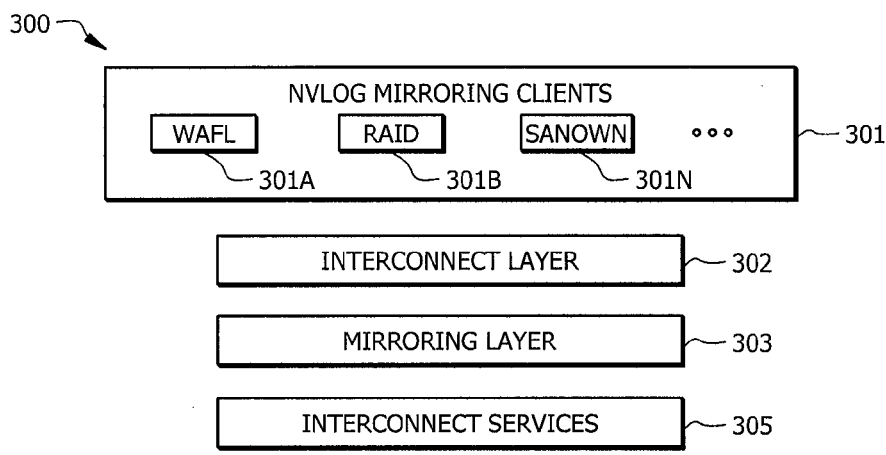
FIG. 3 is an example functional block diagram of a system operable to perform methods disclosed herein.

FIG. 3 shows an example system 300 configured with interconnect architecture. The example system includes mirroring clients 301, for example, WAFL 301a, RAID 301b, software based disk ownership module (SANOWN) 301n, and the like. A mirroring client 301 is a client, which is operable to issue a mirror command. In embodiments, mirroring clients may be resident within one of the nodes illustrated in FIG. 2 (e.g. nodes 216a, 216n, 218a, and 218n). As shown in FIG. 3, interconnect architecture may comprise interconnect layer 302 and mirror layer 303, which is in communication with interconnect services 305. Each of interconnect layer 302, mirror layer 303, and interconnect services 305 may be part of D-Module, 124 and 126 (of FIG. 1).

Figure 4:
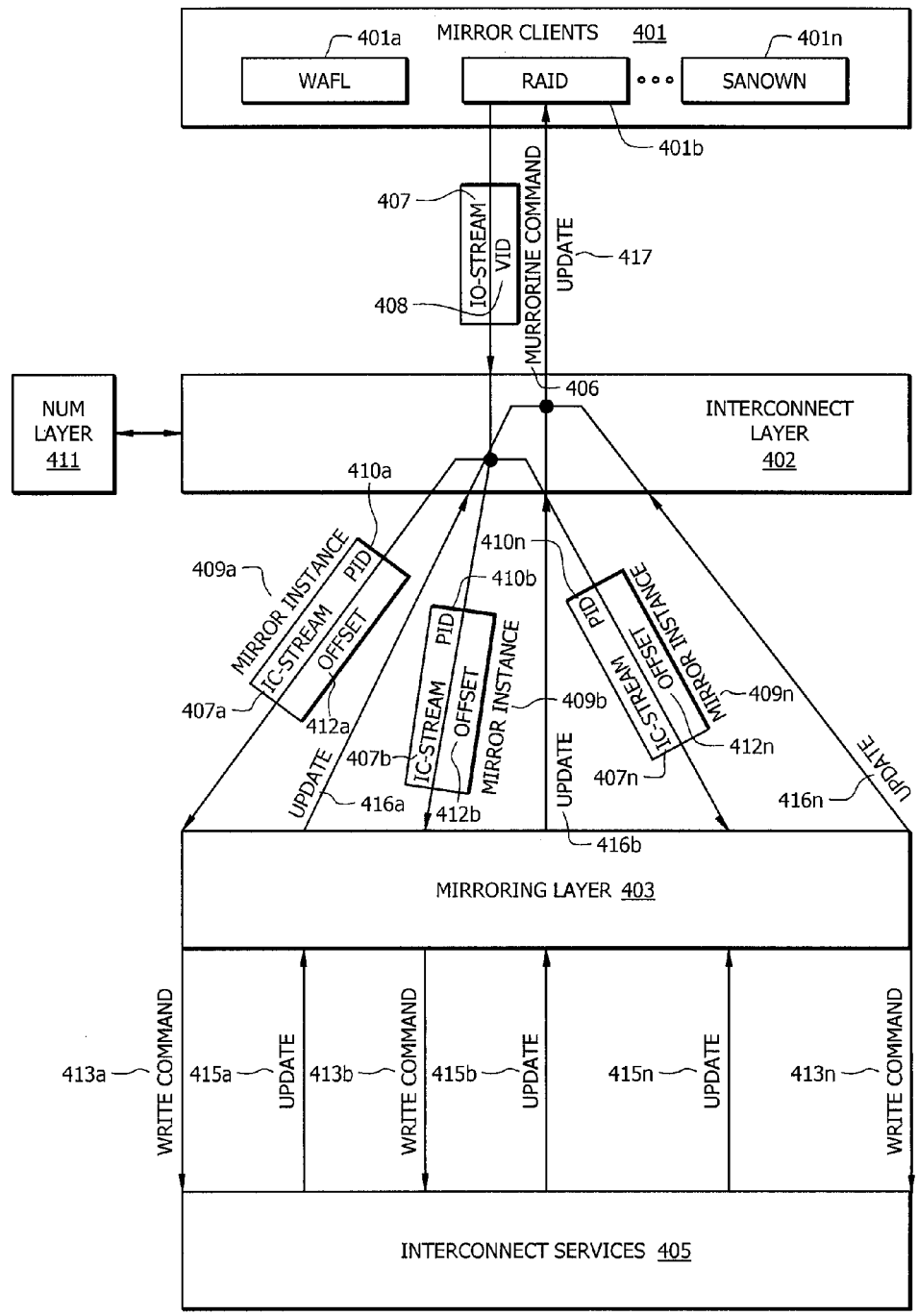
FIG. 4 is an example functional block diagram illustrating an example involving the issuance of a mirroring command.

FIG. 4 shows an example operation which involves simultaneously mirroring data to multiple mirroring partners using the architecture of FIG. 3. When mirroring data to multiple mirroring partners (e.g. nodes 216a, 216n, 218a, and 218n), mirroring clients 401 may be configured such that they have no knowledge of the location or amount of mirroring partners. As such, when issuing a mirror command 406, mirroring clients 401 may issue a single mirroring command 406 in order to initiate a mirroring operation. As such, because a single mirroring command 406 may be issued, the mirroring command 406 may include a mechanism, which can be used by other the interconnect architecture to identify the plurality of partner nodes, identify the number of partners, and identify the location of the partners. To make the present embodiments easier to understand, examples below will involve mirror client 401b resident on node 216a issuing a mirroring command 406. Further, in the examples, nodes 216n, 218a, and 218n are node 216a's partner nodes. Further still, as shown in FIG. 2, node 216n is in node 216a's HA group 217 while nodes 218a and 218n are in node 216's DR group 220.

When mirroring client 401b issues mirroring command 406, interconnect layer 402 receives the mirroring command 406. The mirroring command 406 may include an ic-stream 407 and virtual identifier (VID) 406. The ic-stream 407 comprises the data that is to be mirrored, which may include operational data and its associated metadata. The VID 408 can be used to determine which partners are to mirror the ic-stream, the number of mirroring partners, and the location of the partners.

With the VID 408, interconnect layer 403 may access non-volatile management (NVM) layer 411 to make a runtime determination of which partner mirrors are active at that time and if desired determine which partner mirrors are inactive at that time. NVM layer 411 maintains a per mirror status indicating whether a mirror is active at any given time. Further, NVM layer 411 may also maintain a VID to PID mapping, which maps a virtual identifier (VID) to the physical identifiers (PID) of mirroring partners. FIG. 2b shows an example mapping wherein VID 208 is mapped to PIDs 210a-210n.

In embodiments, VID 408 may be mapped to mirroring partners 216n, 218a, and 218n. Further still, NVM layer may further maintain mirror properties for use in determining offsets that may be included in a mirroring instance. Examples of mirror properties may include whether a particular mirror is a HA node or a DR node, the type of connection to the node (e.g. the transport used), which sections of a storage device (e.g. NVRAM) is used for a respective partner, memory protection keys used for mirroring, and the like. For example, NVM layer 411 may maintain properties that identify node 216n and being an HA node and nodes 218a and 218n as being DR nodes.

With the active partners, their PID's, and their offsets determined, interconnect layer 402 splits mirroring command 406 into a plurality of mirror instances 409a-409n by generating a mirror instance 409 for each respective active partner, wherein each respective mirror instance 409 comprises information relevant to that particular partner and is used to execute a mirroring operation on that particular partner. For example, mirror command 406 may be split into mirror instance 409a for partner node 216n, mirror instance 409b for node 218a, and mirror instance 409n for node 218n. When creating the mirror instances (409a-409n), interconnect layer 402 duplicates ic-stream 407 and includes in the mirror instances (409a-409n) a duplicate of the ic-stream (407a-407n), the physical address of the partner (PID 410a-410n), and the offsets for that partner (412a-412n). With the mirror instances 409 created, interconnect layer 402 synchronously sends each of the mirror instances (409a-409n) to the mirror layer 403. For each mirror instance (409a-409n), mirror layer 403 issues a write command (413a-413n) to interconnect services 405 to write the respective ic-stream to the respective partner according to its respective offset.

Upon receiving write commands 413a-413n, interconnect services 405 executes the write commands 413 which writes the ic-stream to the partner nodes. If a node has become inactive in the time between NVM layer 411 determining that the node was active and the time of executing its respective write command, execution of the respective write command will likely fail. After beginning execution of the writing operations, interconnection services 405 can send one or more updates 415a-415n to mirror layer 403 updating the status (e.g. active, inactive, etc.) and PID of the partner nodes. Mirror layer 403 may send one or more updates 416a-416n to interconnect layer 402 which includes an update of the status of the respective partners (e.g. active, inactive, etc.) and the physical address of the respective partners (e.g. PID 410a-410n). Interconnection layer 402 may send the updated status and PIDs to NVM layer 411 for use in maintaining the per mirror status and PID mapping. Further, interconnection layer 402 may use this updated status and physical address information to determine whether one or more write commands (413a-413n) successfully launched. If interconnect layer 402 determines that at least one write command successfully issued, interconnect layer 402 may inform mirroring client 401b of the success by the populating a VID and returning the populated VID in update 417 to the mirroring client (e.g. RAID 401b).

Figure 5:
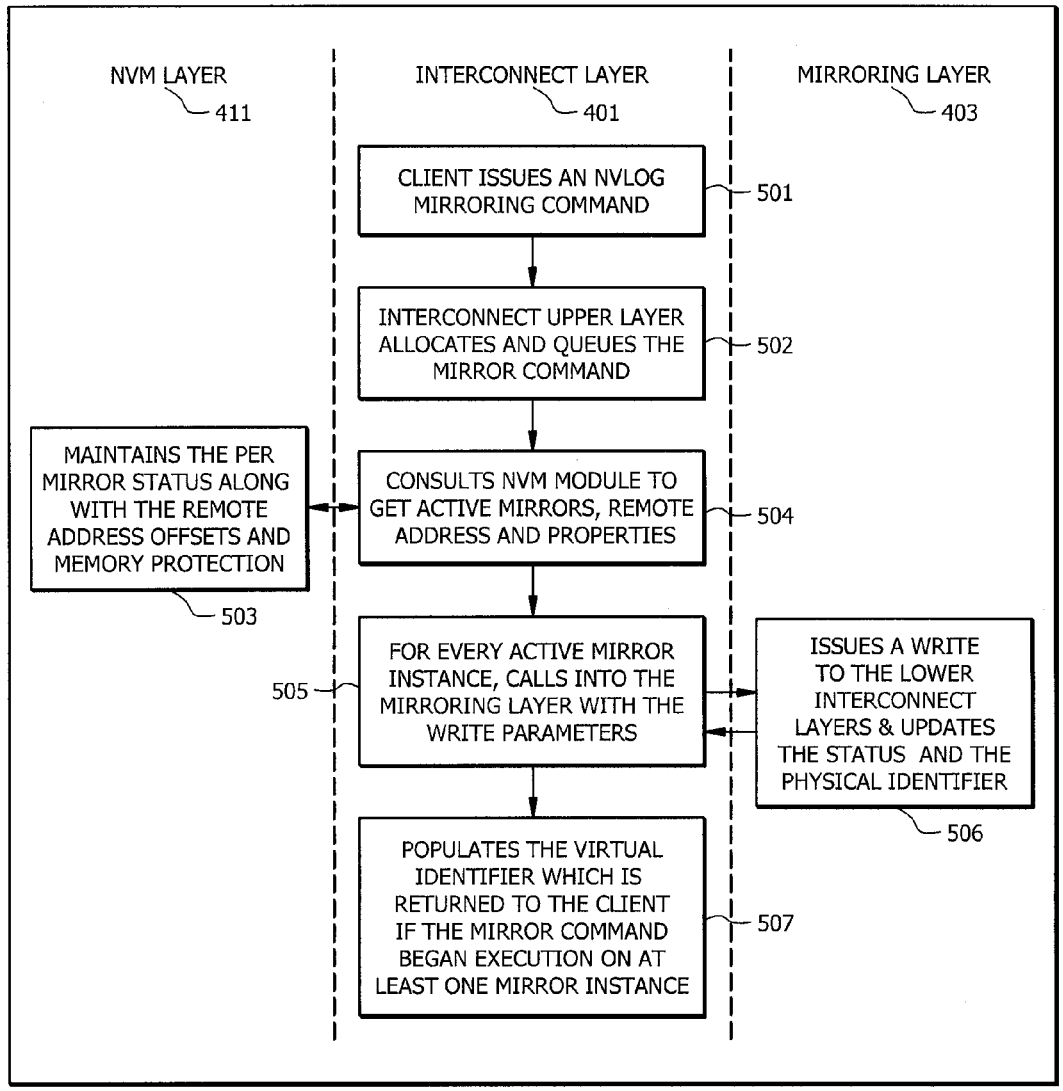
FIG. 5 is an example process involving the issuance of a mirroring command.

FIG. 5 shows a flow diagram of an example method for issuing mirroring command 406. In step 501, mirroring client 401b of node 216a issues a mirroring command 406, which is received by interconnect layer 402. At step 502, interconnect layer 402 allocates and queues mirror command 406. Block 503 shows that NVM layer 411 maintains a status (e.g. active, inactive, etc.), the PID, and properties of each mirror (e.g. partners 216n, 218a, and 218n). At step 504, interconnect layer 402 consults NVM 411 to determine which mirrors of partner mirrors 216n, 218a, and 218n are active mirrors and their PIDs and their properties. At step 505, for every active mirror (in this example all of nodes 216n, 218a, and 218n are determined to be active), interconnect layer 402 simultaneously issues a respective mirror instance 409a-409n (which includes the writing parameters) to mirror layer 403. At step 506, mirror layer 403 simultaneously issues write commands 413a-413n to interconnect services 405 for each mirror instance 409a-409n. Upon issuing the write commands 413a-413n, interconnect services 405 begins executing the write commands in the respective partners 216n, 218a, and 218n. Also upon issuing write commands 413a-413n, mirror layer 403 sends updates to interconnect layer 402 regarding the partners' current status and PIDs. The received status information and PID information may be shared with NVM layer 411. In step 507, if at least one write command 413 was properly issued, interconnect layer 404 populates the VID and returns it to the mirroring client 401b.

At this point, mirroring client 401b issued a single mirror command 406, and transparent to the client, interconnect layer 402 split the single mirror command 406 into a plurality of simultaneous mirror instances 409a-409n. Further, the interconnect layer 402, transparent to the mirror client 401b, determined whether one or more mirroring operations has successfully begun, and if so, mirroring client 401b is informed that the mirroring operation is underway. As explained above, in order to prevent data loss or corruption, it is advantageous to prevent the mirroring client from performing further write operations to the NVLog after issuing a write command 406, until mirroring client 401b confirms that the mirroring operation was successfully finished. In the present embodiments, mirroring operations may be executing on a plurality of nodes; thus, in-order to prevent data loss and/or data corruption, it is desirable that mirroring client 401b withhold an acknowledge indicating completion of a mirroring operation from the clients (e.g. 108 & 110 in FIG. 1), until mirroring client 401b confirms that a mirroring operation was successfully finished.

Figure 6:
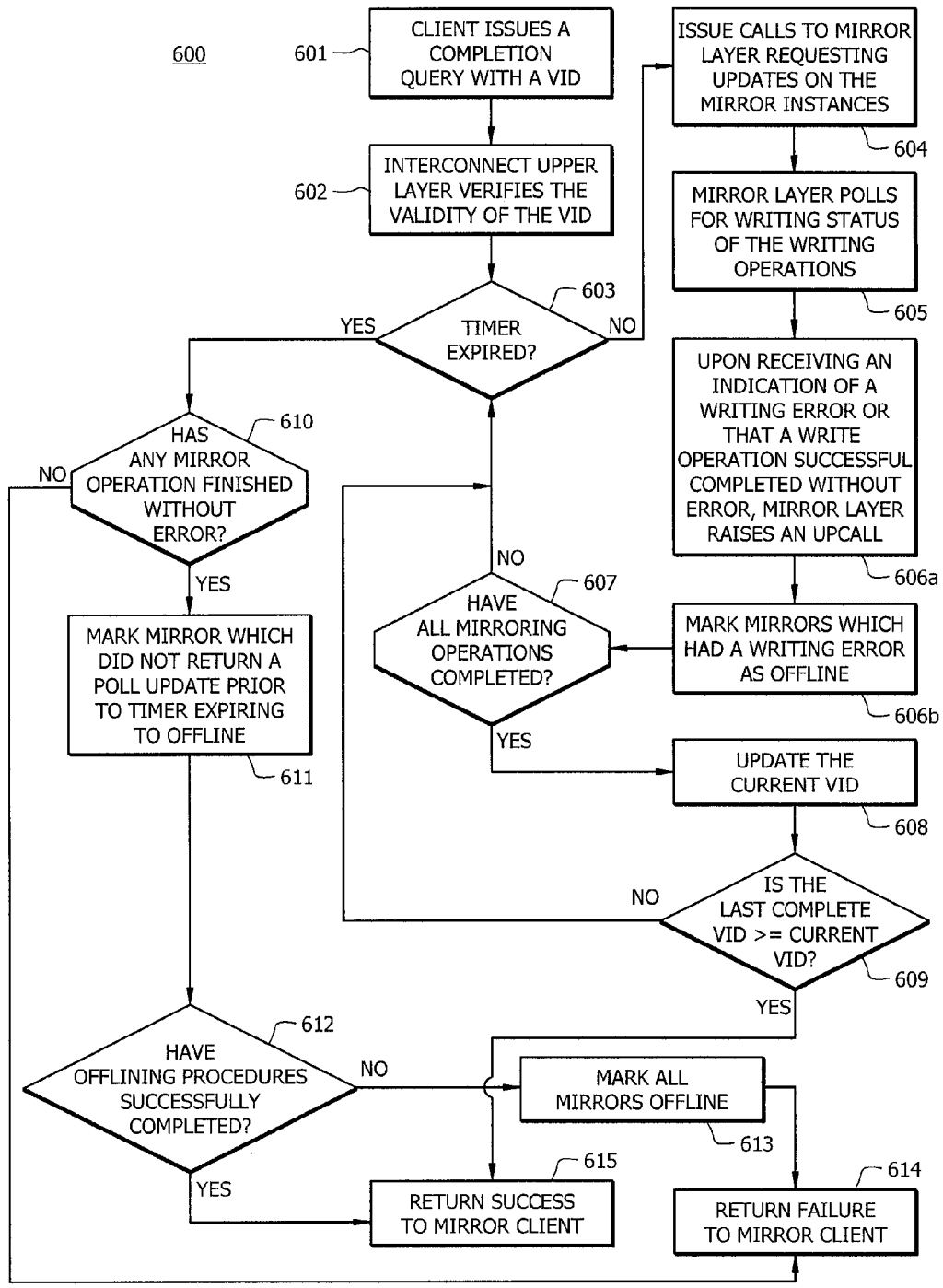
FIG. 6 is an example process for determining whether a mirroring command was successful.
Figure 7:
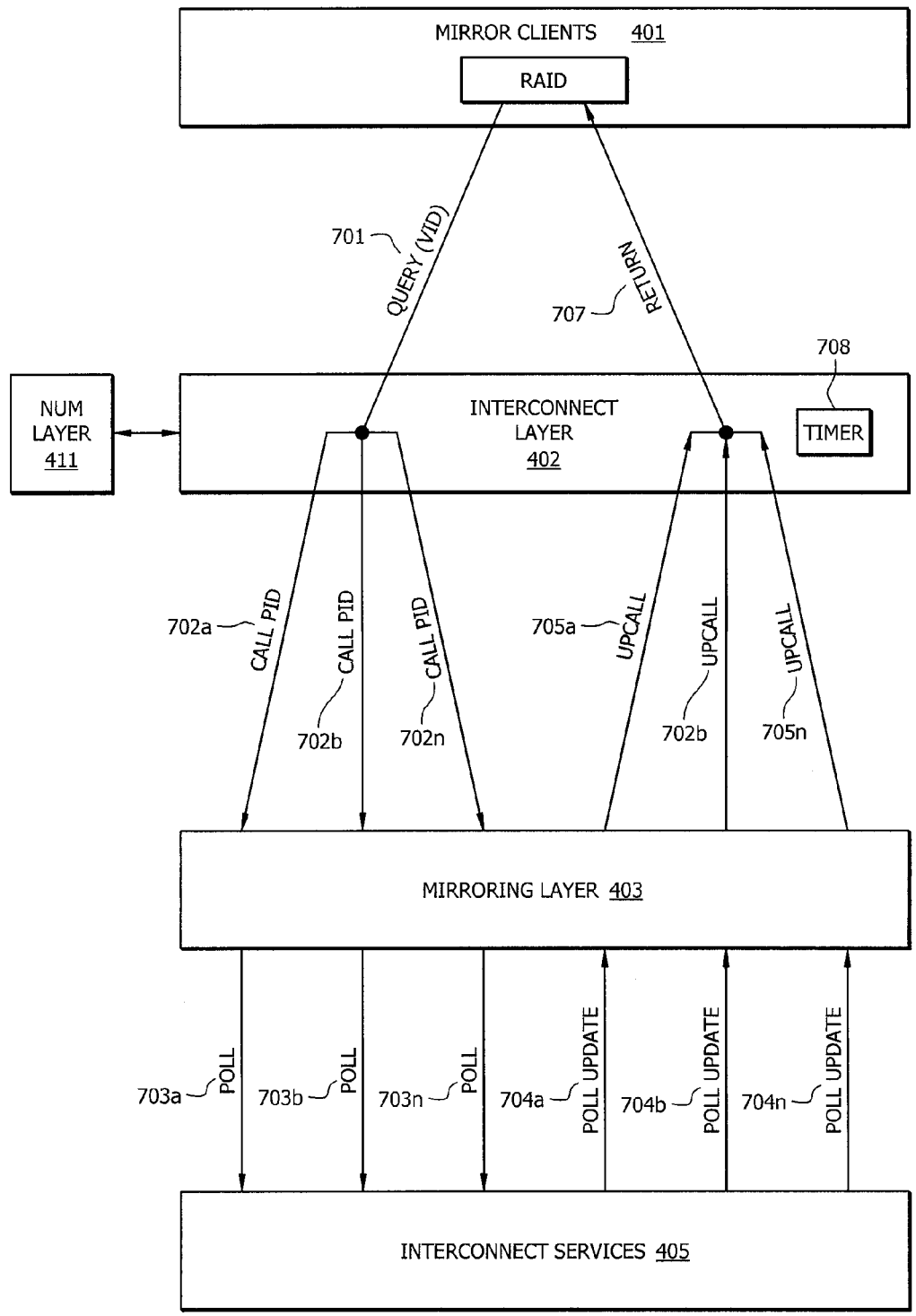
FIG. 7 is an example functional block diagram illustrating an example of determining whether a mirroring command was successful.

FIG. 6 and FIG. 7 are discussed together herein to show embodiment systems and methods for an example completion determination process 600, wherein interconnect layer 402 determines when all mirroring nodes executing mirroring operations have completed their respective mirror operation. In embodiments, a mirroring operation is determined to be completed when the mirroring operation has successfully finished during a timeout period, when the mirroring operation resulted in an error during the timeout period, or when the mirroring operation has not yet finished within the timeout period. When all mirroring nodes are determined to have completed, interconnect layer 402 may send report 707 indicating a SUCCESS or FAILURE to mirroring client 401b. It is advantageous to send report 707 to mirroring client 401b, because in embodiments, after mirroring client 401b issues write command 406, mirror client 401b withholds acknowledgement of the mirroring operation until after mirror client 401b determines whether write command 406 has been successfully executed and finished, thereby reducing the potential for data error or corruption in the event of a take-over by one of the nodes in HA group 217 or DR group 220.

In short, mirroring clients 401a-401n issue a single query 701 to determine the completion status of mirroring command 406. Interconnect layer 402 splits query 701 into a plurality of calls 702a-702n, one for each respective mirroring instance 409a-409n, and simultaneously issues the plurality of calls 702a-702n to mirror layer 403. Calls 702a-702n are requesting an update on the completion status of each respective mirror instances 409a-409n. Mirror layer 403 receives the calls 702 and begins checking the status of each write command 413a-413n in parallel. Upon determining a respective write operation 413's completion status, mirror layer 403 makes a callback to the interconnect layer 402 indicating the respective write command 413's status. Once interconnect layer 402 determines that each mirror instance 409a-409n is complete (whether it is a finished operation, an error, an operation that did not finished before timeout occurred, or the like), interconnect layer 402 sends a single return 707 to mirror client 401b indicating a SUCCESS or FAILURE. As indicated above, to ease understanding, examples herein assume that mirroring client 401b is located in node 216a (of FIG. 2), making node 216n the HA node and nodes 218a and 218n the DR nodes. Of course in practice, mirroring client may be any mirroring client located in any appropriate node of the system.

In detail, completion determination process 600 begins in step 601 wherein mirroring client 401b (located in node 216a) issues query 701. Query 701 comprises the latest VID which was received in update 417 (of FIG. 4). In step 602, interconnect layer 402 receives query 701 and may verify the validity of VID. If the VID cannot be verified, an error indicating that the VID cannot be verified may be returned to mirroring client 401b, wherein process 600 may start over again at step 601. If in step 602 the VID is verified, interconnect layer 402 may determine which mirroring instances 409a-409n were issued based on the VID and the PIDs of the respective mirror instances 409a-409n. Interconnect layer 402 may consult NVM layer 411 to determine the corresponding mirror instances 409a-409n and PIDs. With the mirroring instances 409a-409n (and PIDs) identified, interconnection layer 402 determines whether a timed out has occurred for the mirroring operations. As such, embodiments herein may include one or more timer 708 for use in at least step 603, wherein timer 708 is used to determine whether a writing operation has finished or erred out within a specified amount of time. If a writing operation is still executing when the timer expires, interconnection layer 402 may perform operations based on the determination that one or more writing operation has not successfully finished or erred out prior to the expiration of time.

If at step 603, interconnection layer 402 determines that timer 708 for the writing operations has not yet timed out, the process moves to step 604 were interconnect layer 402 simultaneously issues calls 702a-702n to mirror layer 403 requesting updates regarding the writing status of each mirror (e.g. node 216n, 218a, and 218n). Examples of writing statuses include an indication that a mirroring error has occurred, an indication that a mirroring operation has finished, and/or the like. In step 605, upon mirror layer 403 receiving calls 702a-702n, mirror layer 403 polls 703a-703n interconnect services 405 for the writing status of each executing write command 413a-413n. Node 216a is located close in proximity to node 216n. As such, the poll issued to node 216n (the HA node in this example) is likely to be received quickly because latencies associated with node 216n may be relatively minimal due at least to distance. On the contrary, node 216a is located at a distance from nodes 218a and 218n (the DR nodes in this example). As such, polls issued to the DR nodes are likely to be received more slowly (in comparison to the HA node) due to latencies associated with the DR nodes caused at least by distance. As will be seen below, interconnect layer 402 is operable to handle the varying latencies caused by the varying locations and transports associated with the varying partners.

After issuing polls 703a-703n, interconnect services 405 returns poll updates 704a-704n, which indicate the status of the mirroring operations (e.g. mirroring successfully finished, mirroring error, and the like) for each respective mirroring operation. Due to the varying latencies discussed above, mirror layer 403 may receive poll updates 704a-704n at different times. In embodiments, as mirror layer 403 receives poll updates 704a-704n, at step 606a, mirror layer 403 raises an upcall (e.g. one or more upcalls 705a-705n) to interconnect layer 402 indicating the mirroring status of the respective mirrors (e.g. nodes 216n, 218a, and 218n). Interconnect layer 402 receives upcalls 705a-705n at varying times, due at least to latency issues, and logs the mirror status of each mirror (e.g. nodes 216n, 218a, and 218n) as the upcalls 705 are received.

Upon receiving upcalls 705a-705n, interconnection layer 402 determines whether a respective upcall 705 indicates that a mirroring operation is in error. A mirroring operation may be in error because the mirroring node has experienced a hardware and/or software failure for some reason that affects a portion of the node (e.g. the mirroring portion) or the entire node. Upon receiving an upcall 705 indicating an error, interconnect layer marks the failing node as being offline (step 606b). Treatment of an offlined node is discussed further below with reference to step 611.

Process 600 now moves to step 607, wherein interconnect layer 402 determines whether all mirroring operations have been completed (e.g. by determining whether all expected upcalls have been received). If interconnection layer 402 determines that all mirroring operations have not yet been completed (e.g. either by successfully finishing the operation or by reporting an error), then the process 600 moves back to step 603 to determine whether timer 708 has expired. If at step 603, interconnection layer 402 determines that timer 708 has not yet expired, the process repeats steps 604-607 and 603. In embodiments, when repeating steps 604-607 and 603, interconnect layer 402 may issue progressively less calls in each repeated step 604. For example, when repeating step 604, interconnect layer 402 may limit the calls 702 issued to those nodes which interconnect layer 402 does not yet know whether their mirroring operations are complete. For example, due to latencies, interconnect layer 402 is likely to receive upcalls corresponding to HA nodes before receiving upcalls corresponding to DR nodes. If that is the case, then when repeating step 604, issued calls may be limited to calls to DR nodes. If in step 604, less calls are issued, then in steps 605-607, a correspondingly less number polls may be issued, and a correspondingly less number of poll updates may be issued. Steps 604-607 will be repeated until step 607 determines that all mirroring operations are complete or until step 603 determines that timer 708 has expired.

If at step 607 interconnect layer 402 determines that all mirror instances 409a-409n are complete, process 600 moves to step 608 wherein interconnect layer 402 updates the current VID. Then in step 609, interconnect layer 402 determines whether the last completed VID is greater than or equal to the current VID. Interconnect layer 402 updates the current VID upon determining that all mirror instances 409a-409n are complete. Thus, by determining whether the current VID is greater than or equal to the last updated VID, interconnect layer 402 ensures that all the mirror operations successfully finished. If at step 609 interconnect layer determines that the current VID is greater than or equal to the last updated VID, process 600 moves to step 615, wherein interconnect layer 402 issues return 707 indicating SUCCESS to the mirroring client 401b. When mirroring client 401b knows that its mirroring command was a success, mirroring client may perform operations accordingly. For example, if mirroring client 401b has withheld an acknowledgement of a writing operation until determining the success of writing command 406, upon receiving a return 707 indicating success, mirroring client 401b may acknowledge the writing operation to clients 108 and 110.

Referring back to step 607, if at step 607 interconnect layer 402 again determines that all mirror instances 409a-409n are not yet completed, then process 600 moves to step 603 again. If at step 603, interconnection layer 402 determines that timer 708 has expired, the process moves to step 610 wherein interconnection layer 402 determines whether any mirror operation successfully finished without error (as determined via upcalls 705a-705n). If at least one mirror operation has successfully finished, then mirroring command 406 may be considered a success because the NVLog is mirrored on at least one partner. However, because some of nodes 216a, 218a, and 218n may not have successfully finished the mirroring operation without error, interconnect layer 402 tracks which nodes were successful and which nodes failed so that auto-takeover may remain enabled for the successful nodes and auto-takeover may be disabled for the unsuccessful nodes (thereby preventing an unsuccessful node with incomplete and/or stale data from initiating an auto-takeover).

The interconnect layer 402's ability to issue a report 707 indicating success even though one or more mirroring node 216a, 218a, and/or 218n failed, is unique as compared to mirroring systems which are based on a one-to-one partnership because in a one-to-one partnership, the failure of a single mirroring node causes the report to indicate failure. In contrast, present embodiments may issue report 707 indicating a success, even if one or more mirroring node fails. Interconnection layer 402 tracks which mirror nodes (e.g. 216a, 218a, and 218n) succeed and which failed to ensure that auto-takeovers are successful. Further, interconnect layer 402's operations are transparent to mirroring client 401b, thereby making embodiments herein operable with legacy mirroring clients without having to add overhead and complexity to the legacy mirroring clients.

Referring back to step 610, interconnect layer 402 determines whether any mirroring operations were successfully finished without error before expiration of timer 708. If no mirror operations have successfully finished without error, the process moves to step 614 wherein interconnection layer 402 sends return 707 indicating a FAILURE to the mirror client 401b. Upon mirror client 401b receiving a FAILURE, mirror client 401b knows that mirroring command 406 failed, at which point, if desired, mirror client 401b may take steps to correct the failure, for example issue a new mirror command and continue to cease other operations.

If in step 610, interconnection layer 402 determines that at least one mirroring operations has successfully finished without error, the process moves to step 611, wherein interconnection layer 611 marks mirrors which were unable to return a poll update (e.g. 704a-704n) before timer 708 expired as offline. Marking a mirror node as being offline indicates that for some reason that node failed to complete the mirror operation within the allotted time and as a result contains stale and/or incomplete data. Examples of mirrors which were unable to complete the mirroring operation before the timer expired include mirrors that reported an error before timer 708 expired and mirrors that have not finished their writing operation when timer 708 expired. When a mirroring node (e.g. nodes 216a, 218a, and 218n) is marked as offline, the offlined node is prevented from performing an auto-takeover.

Taking a node offline may take some time to complete, so in step 612, interconnect layer 402 determines whether all offlined mirrors have been successfully taken completely offline before return 707 is issued. In some embodiments, step 612 is limited to determining whether certain ones of the mirrors are completely offline. For example, interconnect layer may determine that a failed HA mirror (e.g. node 216n) is completely offline, but skip that determination for DR mirrors (e.g. nodes 218a and 218n). In other embodiments, step 612 is performed for all failed mirrors (e.g. for example both failed HA mirrors and failed DR mirrors). Making the determination in step 612 ensures that mirroring client 401b, which upon receiving a SUCCESS may be naive regarding which mirror nodes succeeded and which mirror nodes failed, does not receive a SUCCESS while an offlining operation of interest is still in process. Returning a SUCCESS before an offlining operation is complete may lead a situation wherein a failed node initiates an auto-takeover before the failed node is completely taken offline.

If at step 612, interconnect layer 402 determines that the offlining operations of nodes of interest have not yet completed when it is time to issue return 707, then interconnect layer marks all mirroring nodes (e.g. 216n, 218a, and 218n) offline, and issues a return 707 that indicates a FAILURE. Upon mirror client 401b receiving return 707 indicating a FAILURE, mirror client 401b knows that mirroring command 406 failed at which point, if desired, mirror client 401b may take steps to correct the failure, for example issuing a new mirror command and maintaining a hold on other local NVLog write operations.

If at step 612, interconnect layer 402 determines that all of the offlining operations of interest successfully completed when it is time to issue return 707, then at step 615, interconnect layer 402 issues return 707 indicating a SUCCESS.

Because mirroring operations are executing on both HA groups and DR groups, which will be on different transports and located at varying distances thereby experiencing differing latencies, it is likely that the completions will occur at differing times for the various nodes. The above example process allows interconnect layer 402 to manage mirroring completions that occur at differing times while also repeatedly checking timer 708 to determine whether time has expired for the writing operations to be complete. Further, if interconnection layer 402 determines that a writing operation is not complete before the timer expires, interconnection layer 402 marks the nodes having incomplete operations as offline, thereby preventing a node with stale and/or incomplete data from performing a take-over.

With the above described systems and methods, mirroring operations become scalable without mirroring clients having to know about the systems' dynamic size and/or dynamic structure. For example, mirroring nodes may be added and/or taken away from an HA group and/or a DR group and mirroring nodes may become active and/or inactive without the mirroring client knowing or having to account for the changes. Some or all changes to HA groups and/or DR groups may be handled by interconnect layer 402 making dynamics of the mirroring groups transparent to mirroring clients, thereby taking burden away from mirroring clients. As such, if desired, mirroring clients of the proposed systems and methods may continue to operate in the same or similar manner as compared to how legacy mirroring clients operate.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for mirroring data to a plurality of mirror partner nodes comprising:
    receiving, by a storage node computing device, a mirror command comprising a request to mirror data from at least one node to a plurality of mirror partner nodes;
    initiating, by the storage node computing device, write operations to write the data from the at least one node onto the plurality of mirror partner nodes;
    receiving, by the storage node computing device, a completion update for each one of the plurality of mirror partner nodes, the completion update indicating an operational status for each one of the plurality of mirror partner nodes, the operational status comprising a write error operational status or a write successful operational status; and
    providing, by the storage node computing device, an indication of successful completion when the completion update for at least one of the plurality of mirror partner nodes indicates the write successful operational status within a predetermined time period and offlining each one of the plurality of mirror partner nodes for which the completion update indicates the write error operational status.

2. The method of claim 1, further comprising:
    determining, by the storage node computing device, when write operations are not successfully initiated in a mirror partner node of the plurality of mirror partner nodes, wherein the mirror partner node of the plurality of mirror partner nodes on which the write operations are not successfully initiated is designated as a failing node; and providing, by the storage node computing device, an indication that the designated mirror partner node has failed.

3. The method of claim 1, further comprising:

mapping, by the storage node computing device, virtual identifiers to respective physical identifiers of the plurality of mirror partner nodes, wherein the virtual identifiers comprise node quantity data or node location data for the plurality of mirror partner nodes; and determining, by the storage node computing device, the operational status of each of the plurality of mirror partner nodes based on the mapped virtual identifiers.

4. The method of claim 1, further comprising:

sending, by the storage node computing device, an indication that the mirror command failed when the offlining is not completed prior to the predetermined time period elapsing.

5. The method of claim 1, further comprising:

reinitiating, by the storage node computing device, the write operations on the respective mirror partner node of the plurality of mirror partner nodes when the completion update for the mirror partner node indicates the write error operational status and the predetermined time period has not elapsed.

6. The method of claim 1, further comprising:

polling, by the storage node computing device, the plurality of mirror partner nodes based on a polling interval time period to determine the operational status of each one of the plurality of mirror partner nodes.

7. The method of claim 6, further comprising:

grouping, by the storage node computing device, each one of the plurality of mirror partner nodes into a high availability group or a disaster recovery group, wherein the mirror partner nodes in the high availability group receive the write operations from other mirror partner nodes in a same site and the mirror partner nodes in the disaster recovery group receive the write operations from mirror partner nodes in a different site; and adjusting, by the storage node computing device, the polling interval for each one of the mirror partner nodes in the plurality of mirror partner nodes by reducing the polling interval time period for the mirror partner nodes in the high availability group or increasing the polling interval time period for mirror partner nodes in the disaster recovery group.

8. A non-transitory computer readable medium having stored thereon instructions for mirroring data comprising machine executable code which when executed by at least one processor, causes the processor to perform steps comprising:

receiving a mirror command comprising a request to mirror data from at least one node to a plurality of mirror partner nodes;

initiating write operations to write the data from the at least one node onto the plurality of mirror partner nodes;

receiving a completion update for each one of the plurality of mirror partner nodes, the completion update indicating an operational status for each one of the plurality of mirror partner nodes, the operational status comprising a write error operational status or a write successful operational status; and providing an indication of successful completion when the completion update for at least one of the plurality of mirror partner nodes indicates the write successful operational status within a predetermined time period and offlining each one of the plurality of mirror partner nodes for which the completion update indicates the write error operational status.

9. The medium of claim 8, further having stored thereon instructions that when executed by the processor cause the processor to perform steps further comprising:

sending an indication that the mirror command failed when the offlining is not completed prior to the predetermined time period elapsing.

10. The medium of claim 8, further having stored thereon instructions that when executed by the processor cause the processor to perform steps further comprising:

determining when the write operations are not successfully initiated in a mirror partner node of the plurality of mirror partner nodes, wherein the mirror partner node of the plurality of mirror partner nodes on which the write operations are not successfully initiated is designated as a failing node; and providing an indication that the designated mirror partner node has failed.

11. The medium of claim 8, further having stored thereon instructions that when executed by the processor cause the processor to perform steps further comprising:

mapping virtual identifiers to respective physical identifiers of the plurality of mirror partner nodes, wherein the virtual identifiers comprise node quantity data or node location data for the plurality of mirror partner nodes; and determining the operational status of each one of the plurality of mirror partner nodes based on the mapped virtual identifiers.

12. The medium of claim 8, further having stored thereon instructions that when executed by the processor cause the processor to perform steps further comprising:

reinitiating the write operations on the respective mirror partner node of the plurality of mirror partner nodes when the completion update for the mirror partner node indicates the write error operational status and the predetermined time period has not elapsed.

13. The medium of claim 8, further having stored thereon instructions that when executed by the processor cause the processor to perform steps further comprising:

polling the plurality of mirror partner nodes based on a polling interval time period to determine the operational status of each one of the plurality of mirror partner nodes.

14. The medium of claim 13, further having stored thereon instructions that when executed by the processor cause the processor to perform steps further comprising:

grouping each one of the plurality of mirror partner nodes into a high availability group or a disaster recovery group, wherein the mirror partner nodes in the high availability group receive the write operations from other mirror partner nodes in a same site and the mirror partner nodes in the disaster recovery group receive the write operations from mirror partner nodes in a different site; and adjusting the polling interval for each one of the mirror partner nodes in the plurality of mirror partner nodes by reducing the polling interval time period for the mirror partner nodes in the high availability group or increasing the polling interval time period for mirror partner nodes in the disaster recovery group.

15. A storage node computing device comprising:

at least one processor;

a memory coupled to the processor which is configured to be capable of executing programmed instructions, which comprise the programmed instructions stored in the memory to:
- receive a mirror command comprising a request to mirror data from at least one node to a plurality of mirror partner nodes;
- initiate write operations to write the data from the at least one node onto the plurality of mirror partner nodes;
- receive a completion update for each one of the plurality of mirror partner nodes, the completion update indicating an operational status of the write operations for each one of the plurality of mirror partner nodes, the operational status comprising a write error operational status or a write successful operational status; and
- provide an indication of successful completion when the completion update for at least one of the plurality of mirror partner nodes indicates the write successful operational status within a predetermined time period and offlining each one of the plurality of mirror partner nodes for which the completion update indicates the write error operational status.

16. The device of claim 15, wherein the processor is further configured to be capable of executing programmed instructions, which comprise the programmed instructions stored in the memory to:
- send an indication that the mirror command failed when the offlining is not completed prior to the predetermined time period elapsing.

17. The device of claim 15, wherein the processor is further configured to be capable of executing programmed instructions, which comprise the programmed instructions stored in the memory to:
- determine when the write operations are not successfully initiated in a mirror partner node of the plurality of mirror partner nodes, wherein the mirror partner node of the plurality of mirror partner nodes on which the write operations are not successfully initiated is designated as a failing node; and
- provide an indication that the designated mirror partner node has failed.

18. The device of claim 15, wherein the processor is further configured to be capable of executing programmed instructions, which comprise the programmed instructions stored in the memory to:
- map virtual identifiers to respective physical identifiers of the plurality of mirror partners nodes, wherein the virtual identifiers comprise node quantity data or node location data for the plurality of mirror partner nodes; and
- determine the operational status of each one of the plurality of mirror partner nodes based on the mapped virtual identifiers.

19. The device of claim 15, wherein the processor is further configured to be capable of executing programmed instructions, which comprise the programmed instructions stored in the memory to:
- reinitiate the write operations on the respective mirror partner node of the plurality of mirror partner nodes when the completion update for the mirror partner node indicates the write error operational status and the predetermined time period has not elapsed.

20. The device of claim 15, wherein the processor is further configured to be capable of executing programmed instructions, which comprise the programmed instructions stored in the memory to:
- poll the plurality of mirror partner nodes based on a polling interval time period to determine the operational status of each one of the plurality of mirror partner nodes.

21. The device of claim 20, wherein the processor is further configured to be capable of executing programmed instructions, which comprise the programmed instructions stored in the memory to:
- group each one of the plurality of mirror partner nodes into a high availability group or a disaster recovery group, wherein the mirror partner nodes in the high availability group receive the write operations from other mirror partner nodes in a same site and the mirror partner nodes in the disaster recovery group receive the write operations from mirror partner nodes in a different site; and
- adjust the polling interval for each one of the mirror partner nodes in the plurality of mirror partner nodes by reducing the polling interval time period for the mirror partner nodes in the high availability group or increasing the polling interval time period for mirror partner nodes in the disaster recovery group.

* * * * *